United States Patent Office

2,811,550
Patented Oct. 29, 1957

2,811,550

ALIPHATIC AMINO POLYCARBOXYLIC ACIDS AND PROCESS OF PRODUCING THE SAME

Walter T. Young, Jr., Fair Lawn, N. J., assignor to Refined Products Corporation, Lyndhurst, N. J., a corporation of New Jersey No Drawing. Application September 23, 1954,
Serial No. 458,010

12 Claims. (Cl. 260—534)

This invention relates to amino polycarboxylic acids and to a process for producing these acids and their alkali metal salts.

In the production of amino polycarboxylic acids and their alkali metal salts by reacting an alkali metal cyanide and formaldehyde with an aliphatic amine in which theoretically equivalent amounts, i. e., one mol of cyanide and one mol of formaldehyde, are used for each replaceable hydrogen atom carried by the amine, as described for example in the Bersworth Patent No. 2,407,645, granted September 17, 1943, the yield of amino polycarboxylic acid is disappointingly low.

I have discovered that if the amount of alkali metal cyanide and formaldehyde reacted with the aliphatic amine is materially increased over the amount theoretically required to replace each replaceable hydrogen atom on the amine, a substantial increase in the production of the desired amino polycarboxylic acid or a substantial increase in chelation value per unit of aliphatic amine reacted can be made while still using the same amount of the amine.

It is accordingly a principal object of my invention to provide a process for producing aliphatic amino polycarboxylic acids by the reaction of cyanide and formaldehyde on aliphatic amines by which a substantial increase in the yield of the desired product may be secured.

Another object of my invention is to produce aliphatic amino polycarboxylic acids by the reaction of formaldehyde and cyanide on aliphatic amines by a process which is a material improvement over prior processes.

It is still another object of my invention to produce aliphatic amino polycarboxylic acids which show increased sequestering properties for calcium, magnesium and divalent metals, and particularly for ferric ions for each unit of aliphatic amine present in the reaction product.

Another object of my invention is to produce aliphatic amino polycarboxylic acids which are not precipitated from solutions by strong acids or alkalis and which show increased foaming and suspending action in the presence of soaps and detergents.

Another object of my invention is to provide a process for producing aliphatic amino polycarboxylic acids wherein a substantial excess of cyanide and formaldehyde over that necessary to replace all of the amino hydrogens with $CH_2COOH$ groups is used, resulting in a product having higher ion chelating values per unit of aliphatic amine present than the aliphatic amino polycarboxylic acids of the prior art.

It is still another object of my invention to provide a process for producing the alkali metal salts of the aforementioned aliphatic amino polycarboxylic acids.

Various other objects and advantages of my invention will appear as this description proceeds.

Briefly, my invention resides in the discovery that in the various processes used for producing amino polycarboxylic acids heretofore known, and particularly in the amine, formaldehyde, cyanide process as described in said prior Patent No. 2,407,645, an increase in the amounts of cyanide and formaldehyde above the amount theoretically required to replace each amino hydrogen atom, and an increase in the temperature at which the reaction is carried out materially increased the yield of the desired chelating product.

In the production of amino polycarboxylic acids as usually practiced, one mole of cyanide and one mole of formaldehyde are added to the reaction mass for each replaceable hydrogen atom of the amine during the course of reaction. This is the theoretical amount which should be used. However, side reactions compete with the amine for the cyanide and formaldehyde, reducing the yield of the desired product and resulting in an amine which is incompletely saturated with carboxyl groups. Furthermore, ammonia, which is formed by the reaction between the amine, cyanide and formaldehyde, reacts with formaldehyde to form hexamethylene tetramine, a by-product which is undesirable since it lowers the yield of the desired product. The ammonia also reacts to form mono- di- and triacetic acid derivatives as well as glycolates, by-products having relatively low chelating properties. The aforementioned side reactions compete with the amine for the cyanide and formaldehyde, resulting in a product in which the replaceable hydrogen atoms have been incompletely replaced and which product is hence of lower chelating value per unit of amine used than it should be.

In the process of my invention the reaction vessel is charged with the total amount of diamine to be reacted and an alkali metal hydroxide is added thereto to insure sufficiently alkaline reaction conditions to prevent hydrolysis of the cyanide. The cyanide and formaldehyde are then introduced separately and simultaneously, the rate of addition of both being such that the cyanide is always in excess of the formaldehyde by at least ten percent (based on the total cyanide necessary to react with all of the replaceable hydrogens of the diamine) and the total amount of cyanide and formaldehyde added is preferably 25%, or more, greater than the amount theoretically necessary to replace each replaceable hydrogen on the diamine radical. The addition of the cyanide and formaldehyde is further adjusted so that no substantial excess of unreacted formaldehyde is present in the reaction to cause undesirable side reactions. A reaction temperature of 190° F. to 220° F. is maintained by an auxiliary means of heating or cooling. After all the cyanide and formaldehyde have been added, the temperature of the reaction mixture is raised gradually to between about 240° F. and about 250° F. and maintained in this range until all of the by-product ammonia fumes have been expelled.

By gradually adding the cyanide and formaldehyde and maintaining the proper reaction temperature, the ammonia is removed as completely as possible during the course of the reaction, before further reactants are added.

The solution is thoroughly agitated throughout the reaction to prevent local excess concentrations of the reactants. The alkali metal salt of the polycarboxylic amino acid will be formed together with by-products.

By providing super-molar quantities of cyanide and formaldehyde, the inter-reaction between the formaldehyde, cyanide and amine is favored over the side reactions referred to above, and more of the replaceable hydrogens are replaced by carboxyl methyl groups.

I have discovered that an increase of from about 25% to about 67% in the amount of formaldehyde and cyanide above the amount theoretically required to replace each replaceable hydrogen atom with a carboxyl methyl group results in a final product having a 50% higher calcium chelating value when monoethanol ethylene diamine and monopropanol ethylene diamine are used as the amines. The improved results when employing unsubstituted ethylene diamine as the amine are not as pronounced. However, when the latter is used, it is possible to use approximately 75% of the theoretical amount of the diamine while still securing the same calcium chelating value in the final product, thus effecting a substantial economy in the amount of ethylene diamine used.

My tests have shown that the trisodium salt of monoethanol ethylene diamine triacetic acid prepared by reacting theoretical amounts of cyanide and formaldehyde (necessary to replace each replaceable hydrogen atom) with mono-ethanol ethylene diamine yields a final product having a calcium chelating value of 64 mgs. of $CaCO_3$ per gram of solution. This same product prepared in accordance with the present invention by reacting the monoethanol ethylene diamine with super molar quantities of cyanide and formaldehyde (33% excess) results in a final product having a calcium chelating value of 100 mgs. of $CaCO_3$ per gram of solution, an increase of more than 50%.

On the other hand a similar product prepared by reacting mono-ethanol ethylene diamine with less than theoretical amounts of cyanide and formaldehyde (67% of theoretical) yields a final product having a calcium chelating value of only 33 mgs. of $CaCO_3$ per gram of solution, or a decrease of almost 50%.

These tests show that the loss or gain in calcium chelating value of the final product depends upon the amount of cyanide and formaldehyde reacted with the aliphatic amine, and also show that the amino polycarboxylic acids prepared according to the previous processes do not have their amino hydrogens as completely replaced as in the process of the present invention, resulting in final products having low ion chelating values. However, amino polycarboxylic acids prepared by the method of the present invention by reacting the amine with super-molar quantities of cyanide and formaldehyde (these excesses ranging from 25 to 67%, depending upon the amine) clearly show that the amino hydrogens are replaced to a greater extent by carboxyl groups or that other reactions take place which result in a final product having a materially higher chelating value.

The alkali hydroxide which merely serves to provide an alkaline medium and does not enter into the reaction, is introduced in its entirety at the start of the reaction. Likewise, the amine, which does not react with either the cyanide or by-product ammonia alone, is also introduced in its entirety at the start of the reaction. The formaldehyde and cyanide are then slowly added simultaneously, with the cyanide always in excess of the formaldehyde by at least 10%.

The temperature at which the reaction proceeds is of great importance for maximum efficiency of the process. If the temperature is too low, the reaction will go too slowly and difficulty will be experienced in expelling the ammonia. If the temperature is too high, losses of formaldehyde will be excessive resulting in an incomplete reaction. I have found the best operating temperature to be between 190° F. and 220° F. A means of heating and cooling the reaction should be provided to maintain the temperature within these limits.

The rate of addition of the formaldehyde and cyanide is also of importance. The cyanide may be present in an excess which approaches the total amount necessary in the reaction with no apparent loss of efficiency of the reaction.

I choose to feed the cyanide in a molar excess of 10 to 25% over the formaldehyde because the reaction proceeds more smoothly, with no violent evolution of ammonia. The rate of addition of the formaldehyde is most important in that a too rapid feed causes darkening of the product as the result of side reactions. In every instance the flow of formaldehyde should be so regulated that no substantial excess of unreacted formaldehyde is present in the reactor, as an excess leads to a direct reaction of the formaldehyde and cyanide resulting in the formation of glycolates and dark colored resin-like products. I prefer to feed the formaldehyde in an even, continuous manner with the entire addition being completed in 4 to 6 hours.

The addition of an alkali hydroxide is desirable since it prevents the hydrolysis of the cyanide, while at the same time furthering the hydrolysis of the intermediate nitrile product resulting from the reaction of the cyanide with the formaldehyde and amine. This hydrolysis of the intermediate nitrile results in the evolution of ammonia and the formation of the desired final product, the amino polycarboxylic acid.

In order to further describe the invention, the following examples are given by way of illustration, the parts being by weight and all temperatures in degrees Fahrenheit. However, it is to be understood that the invention is not limited to the examples given nor to the exact conditions stated therein.

EXAMPLE 1

210 grams of monoisopropanol ethylene diamine, 40 grams of sodium hydroxide, and 320 grams of water are charged into a reaction vessel provided with a mechanical stirrer, one inlet feed for aqueous formaldehyde, and a second inlet feed for aqueous sodium cyanide solution. The materials in the reaction vessel are heated to 190° to 220° F. A solution containing 352 grams of 96% sodium cyanide in 560 grams water is then introduced simultaneously with 570 grams of 37% formaldehyde solution. This provides a molar excess of 34% of formaldehyde and cyanide more than the theoretical quantity necessary to replace each replaceable hydrogen on the diamine. The rates of addition of these solutions are so regulated that the sodium cyanide is always in excess of the formaldehyde by at least 10%. These additions are further adjusted so that no undue darkening of the solution takes place, the usual period of time being 4 to 6 hours. During these additions, the temperature is maintained between 190° to 220° F. because reaction occurs almost instantaneously, and the major portion of $NH_3$ is expelled at this temperature as it is formed. After all the cyanide and formaldehyde have been added, the temperature is raised slowly to 240° to 250° F. and maintained at this temperature until all the nitrile has been hydrolized and all $NH_3$ fumes have been expelled.

The final product contains approximately 35% of a compound which is believed to be represented by the graphic formula:

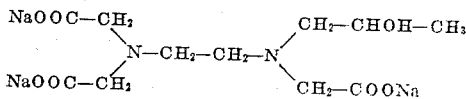

and which is known as the trisodium salt of monoisopropanol ethylene diamine triacetic acid. This product exhibits excellent sequestering properties for calcium, magnesium and divalent metals, and particularly for ferric ions. It is not precipitated by solutions of strong alkalis or acids, and shows increased suspending action in the presence of soaps and detergents.

The solution in the reaction vessel was diluted to a net weight of 2,000 grams. When 5 grams of the resulting solution was titrated with a standardized calcium chloride solution, using 5 ml. of saturated ammonium oxalate solution as the indicator, the calcium carbonate chelating value was determined to be 100 mgs. per gram of solution. An identical amount of the corresponding salt prepared by the use of the exact theoretical amount of cyanide and formaldehyde necessary to theoretically replace each replaceable hydrogen atom of the monoisopropanol ethylene diamine had a calcium carbonate chelating value of 64 mgs. $CaCO_3$ per gram of solution.

In place of monoisopropanol ethylene diamine in the above example, N-hydroxy propyl ethylene diamine may be used with substantially the same results.

EXAMPLE 2

185 grams of mono-ethanol ethylene diamine, 40 grams of sodium hydroxide, and 320 grams of water are charged into a reaction vessel provided with a mechanical stirrer, one inlet feed for aqueous formaldehyde and a second inlet feed for aqueous sodium cyanide solution. The materials in the reaction vessel are then heated to 190° to 220° F. A solution containing 352 grams of 96% sodium cyanide in 560 grams of water is then introduced simultaneously with 570 grams of 37% formaldehyde solution. This provides a molar excess of 34% of formaldehyde and cyanide more than the theoretical quatity necessary to replace each replaceable hydrogen on the diamine. The rates of addition are so regulated that the sodium cyanide is always in excess of the formaldehyde by at least 10%. These rates are further adjusted so that no undue darkening or side reactions occur. This will take from 3 to 6 hours, depending upon the temperature. After all the cyanide and formaldehyde have been added, the temperature is raised slowly to 240° to 250° F. and maintained at this temperature until all ammonia fumes have been expelled.

When diluted to a net weight of 2,000 grams, the final product contains approximately 35% of a compound which is believed to be represented by the structural formula:

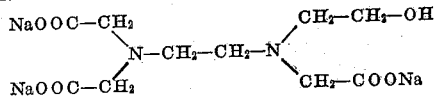

and which is known as the trisodium salt of mono-ethanol ethylene diamine triacetic acid. When titrated with a standard calcium chloride solution, using standard procedure, this material was determined to have a $CaCO_3$ chelating value of 100 mgs. per gram of solution. An identical amount of the corresponding salt prepared by the use of the exact theoretical amount of cyanide and formaldehyde necessary to theoretically replace each replaceable hydrogen atom on the monethanol ethylene diamine had a calcium carbonate chelating value of 64 mgms. $CaCO_3$ per gram of solution.

EXAMPLE 3

Two reactions of the sodium cyanide and formaldehyde with ethylene diamine were carried out, one using the procedure as described in Patent No. 2,407,645, using a 4 to 1 ratio of formaldehyde and cyanide to ethylene diamine, and the other using a 5 to 1 ratio. Temperatures in the reaction were held at 200° to 212° F. during the addition of the cyanide and formaldehyde. A molar excess of 10% of cyanide over formaldehyde was maintained until the addition was complete. The reaction mixtures were then slowly heated to 240° F. to complete the reaction and drive off the ammonia.

Part A 80 gms. of sodium hydroxide
126 gms. of ethylene diamine 87% (1.8 moles) and
320 gms. of water were placed in a reaction vessel equipped with thermometer, agitator and a means of feeding solutions of formaldehyde and cyanide and maintaining temperature at 200° F., and a solution comprised of:

352 gms. of sodium cyanide (7.2 moles)
560 gms. of water were added slowly. When 10% of the cyanide solution had been added, addition of 570 gms. of 37% formaldehyde (7.0 moles)

was begun and the cyanide and formaldehyde solutions were thereafter added in a continuous manner in an equimolar ratio. After the cyanide addition was complete, the remaining 10% of the formaldehyde was added slowly. The time of addition was 4 to 5 hours.

Following completion of formaldehyde addition, the temperature was raised slowly to 240° F. in such a manner that evolution of ammonia was controlled. Heating was continued until the vapors contained no ammonia.

Part B 80 gms. sodium hydroxide
126 gms. 87% ethylene diamine (1.8 moles) and
320 gms. water were reacted with a solution of:

441 gms. sodium cyanide (9.0 moles) in
700 gms. of water and 763 gms. 37% formaldehyde (8.9 moles)

according to the procedure used in Part A of this example. Temperatures and reaction rates were the same. The reaction mass resulting from the reaction described in Parts A and B was diluted in each instance with water to a weight of 2,000 grams. A 5 ml. sample was taken of each solution and titrated with standard calcium chloride solution (1 ml.=10 mgs. $CaCO_3$) using a 4.5% ammonium oxalate solution as the indicator. The results were as follows:

|  | Part A (4 to 1 ratio) | Part B (5 to 1 ratio) |
| --- | --- | --- |
| Titration | 460 mgs. $CaCO_3$ per 5 ml. or 74 mgs. $CaCO_3$ per gram of solution. | 588 mgs. $CaCO_3$ per 5 ml. or 94 mgs. $CaCO_3$ per gram of solution. |
| Relative Efficiency | 100% | 128%. |

The titrations on both Parts A and B indicate that under the conditions of Part A of this example, the amine was probably not saturated with —$CH_2COONa$ groups. The reaction of the cyanide and formaldehyde with ammonia probably accounts for most of the loss. In the product produced according to Part B of this example, as indicated by the titrations, the ethylene diamine appears to be more completely saturated with —$CH_2COONa$ and all of the replaceable hydrogens have been more nearly replaced as a further increase in the ratio of cyanide and formaldehyde to ethylene diamine causes little increase in titration.

Precipitation of the ethylene diamine tetra acetic acid from the products produced according to Parts A and B of this example by acidifying the solution of the sodium salts show about 20% more weight of precipitate of the product produced according to Part B over the product produced according to Part A. This comparison, however, is not entirely satisfactory as washing of the precipitate causes considerable loss in weight and the amino acetic acids formed as by-products are relatively insoluble and, therefore, introduce another source of error into this comparison.

It will be apparent that any alkali metal cyanide or any alkali metal hydroxide may be substituted for the sodium cyanide and sodium hydroxide, respectively, of the above examples. Also, any substance yielding formaldehyde under the reacting conditions, for example paraformaldehyde, may be used in place of the formaldehyde. It will also be apparent that in addition to ethylene diamine, any aliphatic amine having at least two replaceable hydrogen atoms attached directly to the same or different amino nitrogens may be used instead of the monoisopropanol ethylene diamine and monoethanol diamine of the above examples. Such amines are well known to those skilled in the art and it is not deemed necessary to name all of them in detail.

The chemical properties of the alkali metal salts of the above amino polycarboxylic acid are well known. For example, they have the ability to form soluble nonionic chelates with polyvalent metallic ions, completely changing the properties of these ions in solution. This is particularly useful in water softening and also when it is desired to supply plants and trees with iron or other trace elements. In the case of plants and trees it will be apparent that by utilizing the alkali metal salts of amino polycarboxylic acids produced in accordance with the present invention and having increased sequestering properties, increased amounts of iron or other di- or tri-valent metal ions may be supplied to the plants or trees while using substantially the same amount of complexing agent or amino polycarboxylic acid. The alkali metal salts of amino polycarboxylic acids when mixed with soap also form excellent washing agents. Amino polycarboxylic acids and salts thereof also serve as starting materials in the synthesis of more complex products.

This invention provides improved alkali metal salts of amino polycarboxylic acids having substantially increased chelating value for the same amount of original amine as previously used. By the process of the present invention, the original amine may be reduced to sixty percent of theory before a loss in calcium chelating value in the final product is encountered.

While I have set forth certain theories to better explain the increased chelation values attained by the use of my invention, it is to be understood that these theories are for the purpose of illustration only and that whether the use of an excess of cyanide and formaldehyde over the amount theoretically required to react completely with the aliphatic amine results in a more complete saturation of the amine with carboxy methyl groups or whether additional reactions not fully understood take place among the reacting materials, the result is a substantial increase in chelation value per unit of aliphatic amine used, and hence an increase in effective yield of the desired product.

While I have described certain preferred embodiments of my invention for the purpose of illustrating the same, it will be understood that various modifications and changes may be made, as will be readily apparent to persons skilled in the art, without departing from the spirit of my invention or the scope of the following claims.

I claim:

1. In the process of preparing aliphatic amino polycarboxylic acids by reacting an aliphatic amine having at least one replaceable hydrogen atom attached directly to an amino nitrogen atom with an alkali metal cyanide and a formaldehyde-yielding substance, that improvement which comprises carrying out the reaction at temperatures between about 190° F. and 250° F. and using increased amounts of the alkali metal cyanide and formaldehyde-yielding substance in excess of the theoretical requirement of each amino hydrogen of the amine, said excess being from about 25 to about 67 percent of the theoretical requirement.

2. A process of preparing aliphatic amino polycarboxylic acids by reaction of an aliphatic amine having at least two replaceable hydrogen atoms attached directly to the amino nitrogen atoms with an alkali metal cyanide and a formaldehyde-yielding substance, which comprises using an excess amount of cyanide and formaldehyde-yielding substance of more than 125% of the theoretical amount necessary to replace each replaceable hydrogen atom and carrying out the reaction at a temperature of between about 190° F. and about 220° F. until the major part of the reaction has been completed, the temperature then being raised slowly to between about 240° F. and about 250° F. and maintained in this range until substantially all of the ammonia fumes formed during the reaction have been expelled.

3. A process according to claim 2 wherein the amine is mono-isopropanol ethylene diamine.

4. A process according to claim 2 wherein the amine is mono-ethanol ethylene diamine.

5. A process according to claim 2 wherein the formaldehyde-yielding substance is formaldehyde.

6. A process for preparing the tri-sodium salt of mono-ethanol ethylene diamine tri-acetic acid which comprises reacting mono-ethanol ethylene diamine in the presence of an alkali metal hydroxide with an alkali metal cyanide and a formaldehyde-yielding substance in quantities of said cyanide and formaldehyde-yielding substance between about 25% and about 66% in excess of the theoretical requirement of each replaceable amino-hydrogen on the diamine while maintaining a temperature of between about 190° F. and about 220° F., and maintaining the amount of free formaldehyde present in the reaction mixture at any one time at about ten percent less than the amount of alkali metal cyanide present, which ten percent is based on the total quantity of alkali metal cyanide to be reacted, raising the temperature of the reaction mixture slowly after all the cyanide and formaldehyde have been added to between about 240° F. and about 250° F. and maintaining this temperature until all the ammonia formed during the reaction has been expelled, said alkali metal cyanide and formaldehyde-yielding substance being added simultaneously, the rates of addition of said alkali metal cyanide and formaldehyde-yielding substance being further adjusted to maintain the said reaction temperature of between about 190° F. and about 220° F.

7. A process of preparing the tri-sodium salt of mono-isopropanol ethylene diamine tri-acetic acid which comprises reacting mono-isopropanol ethylene diamine with super molar quantities of an alkali metal cyanide and a formaldehyde-yielding substance of between about 25% and about 67% in excess of the theoretical requirements of each replaceable amino-hydrogen on the diamine, in the presence of sufficient alkali metal hydroxide to prevent hydrolysis of said cyanide while maintaining a temperature of between about 190° F. and about 220° F., said alkali metal cyanide and formaldehyde-yielding substance being added simultaneously, the rate of addition of said alkali metal cyanide and formaldehyde-yielding substance being adjusted so that said cyanide is always in excess of said formaldehyde-yielding substance by at least ten percent, which ten percent is based on the total quantity of alkali metal cyanide to be reacted, said rate of addition being further adjusted so that the reaction temperature of between about 190° F. and about 220° F. is maintained, and slowly raising the temperature of the reaction mixture after all the cyanide and formaldehyde-yielding substances have been added to between about 240° F. and about 250° F. and maintaining this temperature range until all the ammonia fumes have been expelled.

8. In the process of preparing aliphatic amino polycarboxylic acids by reacting an aliphatic amine with an alkali metal cyanide and a formaldehyde-yielding substance, that improvement which comprises introducing the aliphatic amine and an alkali hydroxide into a reaction vessel, heating the contents of the reaction vessel to 190° F. to 220° F., flowing an alkali metal cyanide and a formaldehyde-yielding substance simultaneously into the reaction vessel at relative rates of addition so that the cyanide is always in excess of the formaldehyde by at least 10% until more than 125% of the amount of cyanide and formaldehyde-yielding substance theoretically necessary to replace each replaceable hydrogen atom on the aliphatic amine has been added, maintaining the temperature of the reaction mass during the addition of said cyanide and formaldehyde-yielding substance between about 190° F. and 220° F., and after all of the cyanide and formaldehyde-yielding substance have been introduced, raising the temperature of the reaction mass to between about 240° F. and about 250° F. and maintaining the temperature of the reaction mass in this range until substantially all of the ammonia fumes formed during the reaction have been expelled.

9. In the process of preparing the tri-sodium salts of hydroxy alkyl ethylene diamine tri-acetic acid by reacting a hydroxy alkyl ethylene diamine with an alkali metal cyanide and a formaldehyde-yielding substance, that improvement which comprises introducing the hydroxy alkyl ethylene diamine and an alkali hydroxide into a reaction vessel, heating the contents of the reaction vessel to 190° F. to 220° F., flowing an alkali metal cyanide and a formaldehyde-yielding substance simultaneously into the reaction vessel at relative rates of addition so that the cyanide is always in excess of the formaldehyde by at least 10% until more than 125% of the amount of cyanide and formaldehyde-yielding substance theoretically necessary to replace each replaceable hydrogen atom on the hydroxy alkyl ethylene diamine has been added, maintaining the temperature of the reaction mass during the addition of said cyanide and formaldehyde-yielding substance between about 190° F. and 220° F., and after all of the cyanide and formaldehyde-yielding substance have been introduced, raising the temperature of the reaction mass to between about 240° F. and about 250° F. and maintaining the temperature of the reaction mass in this range until substantially all of the ammonia fumes formed during the reaction have been expelled.

10. In the process of preparing the tri-sodium salts of hydroxy alkyl ethylene diamine tri-acetic acid by reacting a hydroxy alkyl ethylene diamine with an alkali metal cyanide and a formaldehyde-yielding substance, that improvement which comprises introducing the hydroxy alkyl ethylene diamine of the group consisting of mono-ethanol ethylene diamine and mono-isopropanol ethylene diamine and an alkali hydroxide into a reaction vessel, heating the contents of the reaction vessel to 190° F. to 220° F., flowing an alkali metal cyanide and a formaldehyde-yielding substance simultaneously into the reaction vessel at relative rates of addition so that the cyanide is always in excess of the formaldehyde by at least 10% until more than 125% of the amount of cyanide and formaldehyde-yielding substance theoretically necessary to replace each replaceable hydrogen atom on the hydroxy alkyl ethylene diamine of the group consisting of mono-ethanol ethylene diamine and mono-isopropanol ethylene diamine has been added, maintaining the temperature of the reaction mass during the addition of said cyanide and formaldehyde-yielding substance between about 190° F. and 220° F., and after all of the cyanide and formaldehyde-yielding substance have been introduced, raising the temperature of the reaction mass to between about 240° F. and about 250° F. and maintaining the temperature of the reaction mass in this range until substantially all of the ammonia fumes formed during the reaction have been expelled.

11. In the process of preparing aliphatic amino polycarboxylic acids by reacting an aliphatic amine with an alkali metal cyanide and a formaldehyde-yielding substance, that improvement which comprises using an amount of cyanide and of formaldehyde-yielding substance which is more than 125% of the theoretical amount necessary to replace each replaceable hydrogen atom on the aliphatic amine and maintaining the reaction mass at a temperature between about 190° F. and about 220° F. until the major portion of the reaction has been completed by introducing the aliphatic amine and an alkali hydroxide into the reaction vessel, heating the contents of the reaction vessel to 190° F. to 220° F., introducing sodium cyanide and the formaldehyde-yielding substance simultaneously into the reaction vessel at relative rates of addition so that the cyanide is always in excess of the formaldehyde by at least 10% and after all of the cyanide and formaldehyde-yielding substance have been introduced, raising the temperature of the reaction mass to between about 240° F. and about 250° F. and maintaining the temperature of the reaction mass in this range until substantially all of the ammonia fumes formed during the reaction have been expelled.

12. In the process of preparing the tetra-sodium salts of ethylene diamine tetra-acetic acid by reacting ethylene diamine with an alkali metal cyanide and a formaldehyde-yielding substance, that improvement which comprises introducing the ethylene diamine and an alkali hydroxide into a reaction vessel, heating the contents of the reaction vessel to 190° F. to 220° F., flowing an alkali metal cyanide and a formaldehyde-yielding substance simultaneously into the reaction vessel at relative rates of addition so that the cyanide is always in excess of the formaldehyde by at least 10% until more than 125% of the amount of cyanide and formaldehyde-yielding substance theoretically necessary to replace each replaceable hydrogen atom on the ethylene diamine has been added, maintaining the temperature of the reaction mass during the addition of said cyanide and formaldehyde-yielding substance between about 190° F. and 220° F., and after all of the cyanide and formaldehyde-yielding substance have been introduced, raising the temperature of the reaction mass to between about 240° F. and about 250° F. and maintaining the temperature of the reaction mass in this range until substantially all of the ammonia fumes formed during the reaction have been expelled.

References Cited in the file of this patent

UNITED STATES PATENTS 2,407,645    Bersworth _____ Sept. 17, 1946